FRANÇOIS GUY AND
MARC BRUEDER
INVENTORS 3,562,375
PROCESS FOR THE SIMULTANEOUS MOLDING AND DECORATION OF ARTICLES MADE OF THERMOSETTING RESINS
François Guy and Marc Brueder, Rumilly, France, assignors to Plastorex S.A., Rumilly, France, a French body corporate
Filed Mar. 25, 1968, Ser. No. 715,918
Claims priority, application France, Apr. 5, 1967, 101,553
Int. Cl. B29c 9/00; B29g 1/00
U.S. Cl. 264—131                                 5 Claims

ABSTRACT OF THE DISCLOSURE

This process for the simultaneous molding and decoration of articles comprises pre-molding resin to give a preform without effecting complete curing of the resin, applying a decorated sheet on the preform and completing the molding, the decorated sheet, prior to application on the preform, being sprinkled with a layer of a thermosetting resin which is in the form of fine grains or powder and compatible with that constituting the preform, said layer being attached to the sheet by exposure to steam. The sheet is applied on the preform in such manner that the layer is remote from the preform.

---

The principle of the simultaneous molding and decoration of articles made of thermosetting material has been known for a long time. It comprises effecting a premolding of the thermosetting resin to impart its ultimate shape to the article, however without effecting complete curing of the material, and then opening the mold and placing a decorated sheet against the preformed article. Generally, such sheet consists of long fibre cellulose paper having a high transparency. Various processes have been suggested within the scope of this general principle.

In a first such prior art process, the printed sheet is impregnated with a thermosetting resin solution and is then applied against the preformed article or preform. The prior techniques placed the printed side so that it appeared externally on the article, which caused rapid wear or deterioration of the drawing forming the decoration, either because of abrasion or of burns, due to insufficient protection of the drawing. Later techniques advocate applying a decorated surface of the paper against the article to be decorated so that the resin-impregnated paper material constitutes the transparent substrate and allows the drawing to be seen through the paper. In this case, the drawing is reproduced on the paper in the form of a reverse image with respect to that it is desired to obtain on the finished article. Thus, protection of the drawing is markedly reinforced. It may be further enhanced by the addition, as an over-molding, of a second transparent sheet, or by the addition in the mold, following re-opening thereof, of an amount of meltable powdered resin capable of becoming welded to the already formed decorated article, addition followed by re-closing of the mold and by an additional molding cycle.

A second prior art process is to be distinguished from the former only in that the sheet is impregnated with a thermosetting resin solution and is then dried before printing.

Both the above processes—which are widely used—have the drawback of a substantial loss in resin material due to the unavoidable impregnated-paper scraps resulting from the cutting up of the decorations. A resin loss is also noted on ageing of the resin baths which cannot be maintained for a long time and which must be frequently renewed, even before being completely used up.

According to a third prior art process, the sheet is printed, but is not impregnated with a thermosetting resin solution. In a first stage, this sheet is bonded to the article to be decorated, the mold being open; a further amount of thermosetting resin capable of becoming welded to the resin (constituting the preformed article) is then added, and, after closing the mold again, ultimate curing of the entire assembly is then effected. This process suffers from the drawback of a poor adhesion between the printed but non-impregnated sheet and the pre-formed article or preform having already been submitted to a polymerization stage, such poor adhesion possibly leading to deformation, tearing or shifting of the drawing. Thus, all such prior art processes have the drawback of being both costly, with respect to raw materials, and of having a long complex molding stage.

It is an object of the present invention to overcome such drawbacks by means of a process which will be more economically valuable from the standpoints of cost, power consumption, amount of thermosetting resin used, required manpower, and of time required for the molding cycle.

It is a further object of the invention to provide decorated articles having a surface curing and gloss which, apart from the resulting commercial attractiveness, will considerably enhance their characteristics of mechanical resistance, of resistance to chemical agents and to incandescence, and having a decoration which is not susceptible to subsequent degradation due to abrasion, burning or chemical attack, which is a most important criterion of the resulting decorated article and makes of same an outstanding high performance commercial product.

Accordingly, the process of this invention comprises pre-molding thermosetting resin into a preform in a mold but without completely curing the resin, taking a sheet of material which has not been impregnated with resin and carries a printed decoration on a face thereof, sprinkling a face of said sheet outside said mold with a thermosetting resin which is compatible with than constituting said preform, and is in the form of powder or fine grains so as to form a layer of thermosetting resin on said sheet, sufficiently exposing said layer of thermosetting resin and said sheet to steam so that said layer becomes sufficiently attached to a face of the sheet to preclude said layer of thermosetting resin from coming away from said sheet in subsequent handling during the process, applying the sheet to said preform so that said layer is remote from said preform, and terminating the molding and curing the surface of the article in said mold.

This process takes place substantially in three stages which may be analyzed in detail as follows:

(a) Preparation stage of the decorated sheet.

It comprises first attaching a thermosetting resin in the form of a powder or fine grains on a printed, but non-impregnated, sheet. For this purpose, the resin is sprinkled over the sheet surface intended to be placed externally with respect to the preform i.e. is sprinkled over what will be the outer surface of the sheet when the sheet is in position on the article. The resin which has not fallen on the sheet is readily recovered and automatically recycled without any alteration of its reactive properties. The sheet thus covered with a thin resin film or layer is then rapidly passed over a steam generator which wets it slightly but sufficiently for the resin to adhere to the surface of the sheet, without falling off. The purpose of this adherence is to obtain from the sheet and resin coating a coherent assembly which will not become separated on subsequent handling. The humidity content thus obtained is not above that normally found after drying the impregnated sheets according to the other processes previously described. On the other hand, any other means suitable for binding the resin may also be used. A decorated sheet having a surface coated with a thin potentially reactive resin film or layer is thereby obtained. The surface thus coated may comprise a higher resin percentage than that resulting from impregnation thereof with a solution of the same resin, without, however, leading to as high a cost in resin as the prior processes. This is due to the fact that, in the present invention, the resin film is preferably provided only on that part of the decorated sheet which will actually be applied to the article. In contrast, in the prior processes, it was necessary to impregnate the entire sheet and, thus, a large amount of resin was lost in the scraps produced when the sheet was cut off. Therefore, the sheet produced according to the invention will be perfectly protected subsequently by the presence of a sufficient amount of resin.

Such a protection being ensured, either side of the printed sheet may be provided with the resin film. In the case where the printed side is subsequently to be placed externally, with respect to the article, then the decoration is printed on what will eventually be the outer surface of the sheet, and in the case where the printed face is not given a resin coating and, therefore, is to be placed subsequently against the preform, then the decoration will be printed on what will eventually be the reverse or inner surface of the sheet, as a mirror image of what is actually required to be seen on the finished article. It is an advantage of the process according to the invention that molding can be effected with the decoration printed either on the outer side or on the inner side of the sheet without any risk of subsequent degradation of this decoration.

(b) Pre-molding stage of the thermosetting molding powder to produce a preform, but, without effecting complete curing of the thermosetting resin present in the molding powder.

(c) Simultaneous decoration and curing stage of the preform, leading to the production of the finished decorated article. The mold being opened at the end of stage (b) above, the decorated sheet covered on one of its sides with the reactive resin film resulting from stage (a) is placed inside the mold, the thus resin coated side facing externally with respect to the object (and not facing the article). As mentioned above, this side may be, or not, the printed side, the choice being left to the user, according to the nature of the printing of the drawing on the sheet. The mold is closed again, and the molding process is terminated by separate or simultaneous action of temperature and pressure. Thus, high adherence of the decorated sheet on the preform may be achieved in a single operation, due to a sufficient migration of the resin through the sheet, and the surface curing of the decorated article may be achieved with excellent gloss, due to the presence of the resin film bonded to the surface of the decorated sheet.

The resins useful for the manufacture of molded articles are of thermosetting type, such as phenolplastic, aminoplastic, epoxy, polyester resins, and the like. Included among such resins are more particularly those of phenol/formaldehyde, urea/formaldehyde, and melamine/formaldehyde type, and mixed resins obtained by admixture of the components during the condensation stage, such as melamine/phenol/formaldehyde, melamine/urea/formaldehyde, phenol/urea/formaldehyde or melamine/phenol/urea/formaldehyde resins, or resins containing these various components modified during the reaction stage by addition of materials which may participate in the polycondensation.

Such resins are used in conventional manner, in the form of molding powder with inorganic (asbestos, slate, mica, glass fibre, etc. . . .) or organic fillers (such as wood dust, cellulose powder or fibres, regenerated cellulose, natural or synthetic fibre cloth, etc. . . .). All such fillers may be in any suitable physical forms.

The thermosetting resin bonded in stage (a) to one of the sides of the printed sheet may be either of the same type as the thermosetting resin used for the manufacture of the molding powder, or of another type, provided only that the resin coated on the sheet be compatible with the resin of the preform. Thus, melamine resins may be used for molding on urea, melamine or phenol resins, and urea resins for molding on melamine, phenol or urea resins, etc. . . . The printed sheet is of currently used type. Generally, it is a paper sheet obtained from long fibre cellulose, having a high transparency. The drawing is printed on such sheet using any of a variety of known printing means, and using dyes or pigments that will not run in contact with the molding powders or the thermosetting resins. Because of this stability, subsequent smudging of the drawing will not occur.

The process according to the present invention exhibits the following advantages over known processes:

Substantial savings in the resin sprinkled on the decorated sheet, said resin being bonded solely to the actually used side of the sheet whereas the impregnation effected heretofore was accompanied by substantial losses in fragments of impregnated sheets due to the necessary cutting up;

Substantial savings in resin due to the fact that the resin bonded to the decorated sheet serves also to achieve surface curing and the glossy effect of the resulting finished article, whereas in the case of prior impregnation of the decorated sheets with a resin, a further amount of the same or different resin had to be added subsequently in the mold to achieve such curing and gloss;

Savings in resin due to the fact that the resin is used in a dry form which always remains usable in an entirely reactive form, whereas the use of aqueous solutions for impregnation is inevitably attended by losses due to the rapid ageing of resin solutions because of which, in most cases, the residual baths are unusable at the end of the operation;

Savings in power consumed in the conventional drying process of the decorated or printed sheets;

Time saved, because sprinkling on of the dry resin does not require the preparation of a solution, or the drying of papers impregnated by means of a wet process, so that the manpower requirements are thereby decreased;

Savings both in time and manpower, because of the two stage process (molding and simultaneous surface curing and gloss) with a single opening of the mold, whereas the conventional process using an impregnated or non-impregnated decorated sheet, with addition of the resin in the mold, requires three stages and two openings of the mold;

Possibility of using fatty inks, because this is a dry process and the presence of fatty materials does not prevent penetration of the resin which, in the prior processes, was used with water as vehicle;

Possibility of using non-absorbing paper sheets. Indeed, while ordinary papers, due to the finishing materials they contain, do not absorb the liquid resin bath, the sprinkled resin sticks to the paper surface and penetrates the paper at the time of pressure molding. In the case where non-absorbing papers are used, it is preferred to sprinkle the resin on both sides of the sheet;

Enhanced gold or silver colours, because there is no danger of the surface coating of the metal pigment being harmed by the dry resin spray which affords subsequently efficient protection of such colours due to the presence of the resulting film.

On the other hand, the decorated sheets resulting from stage (a), due to the use of a resin in dry powder form, exhibit no deformation, which is not always the case when an impregnation type resin is used because the sheets will deform when wet. Due to this good distribution of the resin, the surface curing process of stage (c) takes place homogeneously, which is not always the case with processes involving the addition of resins in the mold which may result in a poor distribution of this added resin on the decorated article.

This is evidenced by a highly improved standard of the resulting decorated article, which is thus an improved industrial product. In addition, the advantages of the present invention are also evidenced by the absence of a large proportion of rejects found in the other processes where the articles exhibit molding defects, blisters and cracks due either to the deformation of the decorated sheets at the time of impregnation, or to the poor distribution in the mold of the added resin.

Thus, the process according to the invention makes it possible both to operate under extremely valuable and profitable processing conditions, and to obtain very high performance decorated articles, both from the standpoint of the mechanical characteristics of the resulting articles and from the standpoint of the permanent character of the decoration used.

Non limiting examples embodying the present invention are given below.

Reference will be made to the accompanying drawing, given solely for illustrative purposes in which.

In each of the examples, the process according to the present invention will be compared with the conventional process first mentioned in the preamble of the present disclosure, for the purpose of demonstrating the advantages of the present invention.

EXAMPLE 1

In this example, it is contemplated to mold and decorate an article made of a melamine-based molding powder.

Figure 1:
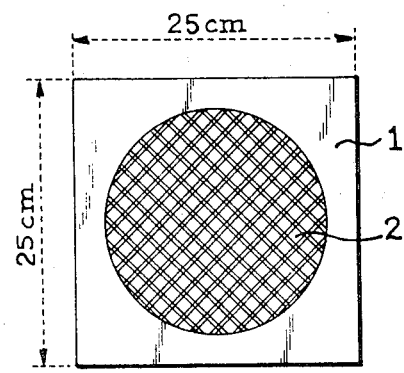
FIGS. 1 and 2 are plan views of the decorated sheet and of the portion thereof which is actually used, respectively, in Example 1.

The article to be manufactured is round, with a diameter of 200 mm. For the decoration, a paper sheet 1 (FIG. 1) made of long fibre cellulose, measuring 250 x 250 mm. (shape and size required by the characteristics of printing and impregnating machines) is used.

The decoration is printed according to the usual methods, on the surface 2 of the sheet corresponding to that of the article to be manufactured.

The sheet is impregnated according to the conventional process. For this purpose, after maintaining the sheet for a sufficient period of time in an aqueous melamine resin bath, the sheet is dried by passage between rolls. This sheet is then dried in a tunnel.

Figure 2:
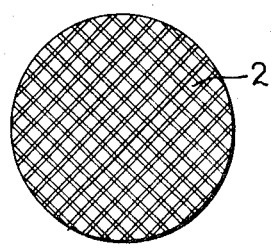

It is then cut up in the shape of a disk 2 (FIG. 2) having a diameter corresponding to that of the article.

The bath formulation and the drying step are controlled in such a manner that the impregnated dried decorated sheet includes an equal (50:50) ratio of paper and resin.

It will be readily determined that for a sheet of paper weighing 60 grams per square metre, 3.75 grams of paper and 3.75 grams of resin will be used.

However, due to the scraps resulting from the cutting up procedure, 1.86 grams of resin will be lost, amounting substantially to 50% of the resin used.

Molding is then carried out under the usual conditions, viz: into a mold heated at a temperature of about 160° C., is introduced an amount of pelletized or non-pelletized melamine-based molding powder, pre-heated or not, corresponding to the weight of the desired article.

The mold is thus closed, and then reopened after a period of time of about forty-five seconds, when the decorated sheet is introduced as described above, and the mold is again closed to effect perfect adherence of the decoration on the article.

The mold is then reopened a second time, after about thirty seconds and pure melamine resin is deposited on the decorated surface, in an amount of about 5 grams, which represents the theoretical amount advocated, i.e. 1.5 grams per 100 cm.$^2$.

The mold is then cautiously closed and the molding process is allowed to proceed for a further sixty seconds.

The cycle is then completed, the mold opened a last time and the article removed from the mold.

Thus, the theoretical time for such cycle is 135 seconds, to which should be added the time required for the three opening and closing procedures, and also the time required for the manual operations effected by the operator. This time may be estimated, without exaggeration, as being of 20 seconds for each such operation, so that the ultimate time for the complete cycle is 195 seconds.

Thus, the total amount of melamine used (except, obviously, for that contained in the molding powder) is 8.75 grams, of which 3.75 grams represent the resin used for the impregnation of the sheet, and 5 grams the resin added during the third stage of the molding process. Of the total 8.75 grams, 1.86 grams (about 22.5%) are lost as scrap paper.

The same article is then manufactured using the process according to the invention.

For this purpose, a sheet 250 x 250 mm. is also used as starting material.

Printing of the decoration at 2 is then carried out as above. On completion of this operation, the sheet is cut up to conform with the size of the article to be decorated. Resulting disk 2 (FIG. 2) is then sprinkled with resin so that the amount received by the sheet is about 5.5 grams. This sheet is then passed through a steam generator, the steam bonding or attaching the resin to the paper. Molding is then carried out.

Using the same mold as previously described, the same amount of melamine molding powder is introduced, and the mold is then closed and opened after a same period of time of forty-five seconds. The decorated sheet prepared as mentioned above is then placed on the surface of the preformed article or preform. The mold is then closed to effect polymerization. After sixty seconds, the mold may be opened and the article removed. It is found that the decorative sheet adheres perfectly to the preform, and that the surface of the article is perfectly cured and glossy.

Total time, for the cycle, is only 145 seconds, i.e., a saving of 25.64% with respect to the time required with the prior process. The amount of resin consumed is 5.5 grams, which, with respect to the preceding process, represents a saving of 37%.

EXAMPLE 2

Figure 5:
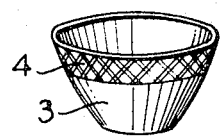

In this example, it is contemplated to mold and decorate a bowl 3 (FIG. 5). The shape of this article is such that application of a paper on the entire outer surface is not possible, and that only a border 4 may be applied on the upper portion of the article.

Figure 3:
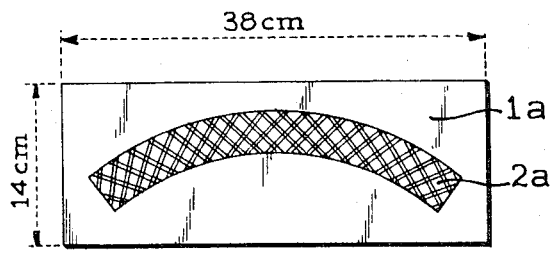
FIGS. 3 and 4 are views corresponding to those of FIGS. 1 and 2, respectively, for the embodiment of Example 2, and, FIG. 5 is a perspective view of the decorated article obtained according to Example 2.
Figure 4:
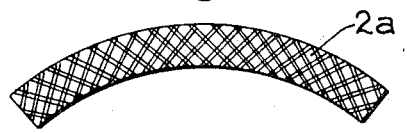

To obtain this border, it is necessary to fabricate some kind of skirt 2a (FIG. 4). For this purpose, a rectangular sheet 1a (FIG. 3) 38 cm. by 14 cm. is used, from which member 2a is cut off (FIG. 4) in the shape of an arc of a circle. The weight of such a sheet is about 3.5 grams, whereas that of the decoration cut-off is only 1 gram.

Using the conventional procedure, paper sheet 1a is printed, impregnated, dried and cut-off as set forth in Example 1. Molding is then carried out, as follows:

(a) pre-molding using a pellet of adequate weight; time: 45 seconds,
(b) opening of the mold and placing the decoration as desired; time: 20 seconds,
(c) molding of the decoration; time: 30 seconds,
(d) opening of the mold and addition of pure resin, in this case in an amount of 3 grams, corresponding to the surface area of the article; time: 20 seconds, (e) polymerization; time: 60 seconds,
(f) opening of the mold; time: 20 seconds.

The total molding cycle is identical with that noted in Example 1, i.e., 195 seconds.

Total amount of resin used: 3.5 grams+3 grams=6.5 grams.

Molding of the same article according to the present process is conducted as follows:

Using printed paper sheet 1a as starting material, usable decorative member 2a is cut off and is sprinkled with resin in an amount of 2.5 grams. This member is then passed through the steam generator.

Molding is then carried out as in Example 1, viz:

(a) pre-molding: 45 seconds,
(b) placing the decoration: 20 seconds,
(c) polymerization: 60 seconds,
(d) opening of the mold: 20 seconds.

It is apparent from the above that total time, for the cycle, is only 145 seconds, the time saved being thus 25.64%. Only 2.5 grams of resin were consumed, i.e., only 38.4%, which represents a savings of almost 62%.

In addition, on opening of the mold, it is found that the entire outer surface of the bowl, including the bottom portion, is perfectly glossy and glazed, the resin placed on the paper surface having spread over the entire outer surface.

Thus, this article exhibits qualities which are at least equal to those of the article molded according to the prior process, but which are obtained with considerable savings in material and labor.

It is understood that the present invention is not limited to the embodiments described that are given solely for illustrative purposes.

Having now described our invention what we claim as new and desire to secure by Letters Patent is:

1. Process for producing a decorated molded thermosetting resin article, comprising pre-molding thermosetting resin into a preform in a mold but without completely curing the resin, taking a sheet of material which has not been impregnated with resin and carries a printed decoration on a face thereof, sprinkling a face of said sheet outside said mold with a thermosetting resin which is compatible with that constituting said preform, and is in the form of powder or fine grains so as to form a layer of thermosetting resin on said sheet sufficiently exposing said layer of thermosetting resin and said sheet to steam so that said layer becomes sufficiently attached to a face of the sheet to preclude said layer of thermosetting resin from coming away from said sheet in subsequent handling during the process applying the sheet to said preform so that said layer is remote from said preform, and terminating the molding and curing the surface of the article in said mold.

2. The process of claim 1, wherein the sheet is cut to the size of the decoration prior to receiving said layer of resin.

3. The process of claim 1, wherein said compatible thermosetting resin is sprinkled on the face of said sheet carrying the decoration.

4. The process of claim 1, wherein the decoration is printed as a mirror image of the decoration required to be seen in the article, on a face of the sheet opposed to said face on which said compatible thermosetting resin is sprinkled.

5. The process of claim 1, wherein both faces of the sheet are sprinkled with said compatible thermosetting resin.

References Cited

UNITED STATES PATENTS

| | | | |
|---|---|---|---|
| 2,401,180 | 5/1946 | Parmelee | 264—137 |
| 2,602,192 | 7/1952 | Silberkraus | 264—134 |
| 2,833,685 | 5/1958 | Lawrence | 264—132 |
| 3,057,018 | 10/1962 | Lawrence | 264—132 |
| 3,410,943 | 11/1968 | Rosenberger | 264—255 |
| 3,421,967 | 1/1969 | Hochner | 264—132X |
| 2,872,337 | 2/1959 | Heritage | 264—112X |
| 3,286,007 | 11/1966 | Wilkie | 264—112X |

FOREIGN PATENTS

| | | | |
|---|---|---|---|
| 523,008 | 3/1956 | Canada | 264—132 |
| 523,009 | 3/1956 | Canada | 264—135 |
| 553,432 | 2/1958 | Canada | 264—123 |

DONALD J. ARNOLD, Primary Examiner

R. R. KUCIA, Assistant Examiner

U.S. Cl. X.R.

264—112, 136, 246